Feb. 19, 1935.  C. C. BAILEY  1,991,836
INSECT SWATTER
Filed Oct. 10, 1933
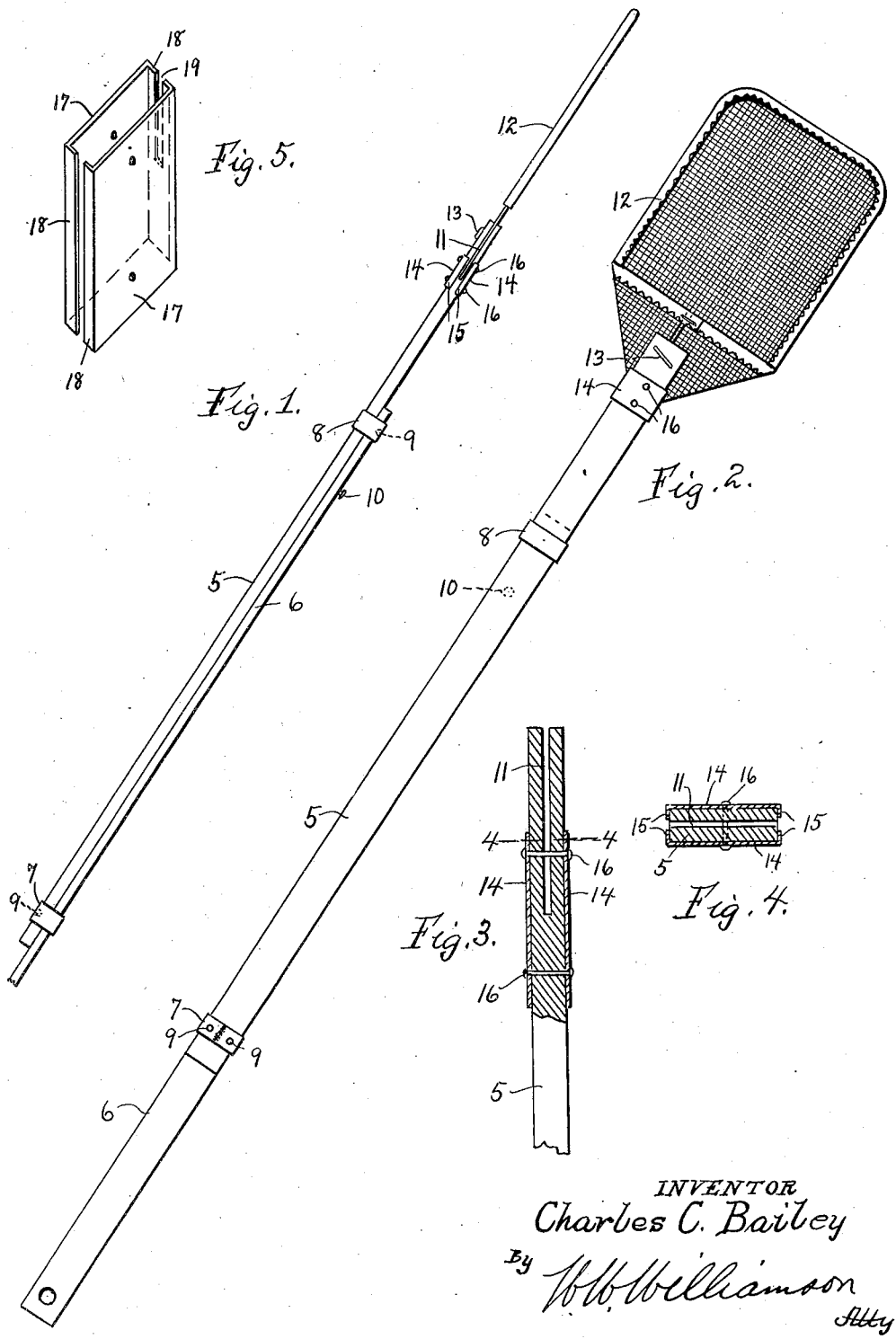
INVENTOR
Charles C. Bailey Patented Feb. 19, 1935

1,991,836

UNITED STATES PATENT OFFICE 1,991,836

INSECT SWATTER

Charles C. Bailey, Smithville, N. J., assignor to Albert Stern, Bernardsville, N. J.

Application October 10, 1933, Serial No. 692,930

1 Claim. (Cl. 43—137)

My invention relates to new and useful improvements in an insect swatter and has for one of its objects to provide such a device with an extension handle in order to increase the efficiency and scope of usefulness thereof.

Another object of the invention is to produce a relatively inexpensive device of this kind and therefore the extensible handle is formed of two wooden sections or sticks which are oblong in cross section and are slidable side by side through yokes carried by said sticks.

Another object of this invention is to fashion an extensible handle from wooden sections or members, one of which carries a yoke at its lower end embracing the other section and said other section carries a similar yoke embracing the first mentioned section, said members being limited in their movements in the extending direction by a stop on one of the members cooperating with the yoke of the other member.

A further object of the invention is to provide a unique means for bracing or strengthening the slotted end of the handle member to which the swatter head is secured.

With these and other ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawing forming a part of this application, in which:—

Fig. 1 is an edge view of an insect swatter constructed in accordance with this invention showing the handle slightly extended and a portion of the lower member broken off.

Fig. 2 is a view at right angles to Fig. 1.

Fig. 3 is an enlarged fragmentary longitudinal section of the upper end of the upper handle member.

Fig. 4 is a section on the line 4—4 of Fig. 3.

Fig. 5 is a perspective view of a modified form of strengthening means.

In carrying out the invention as herein embodied, 5 and 6 represent two wooden handle members or sections of substantially the same length which are oblong in cross section and positioned side by side in contradistinction to edgewise.

The member 5 has a yoke 7 fixed to its lower end which embraces the member 6 and said member 6 has a yoke 8 fixed to its upper end which embraces the member 5 thereby slidably connecting the two members so that they may be extended or contracted.

Both yokes are identical and are fashioned from strips of metal bent to form bands of rectangular shape with their meeting ends fastened together. Each yoke surrounds the two handle members snugly and is fixed to an end of its respective handle member by indenting portions of the metal into the wooden handle member as at 9.

In order to limit the separating or extending movements of the handle members and provide for a substantial overlap of said members in their extended positions, a tack 10 or equivalent is positioned on the member 5 a distance from its lower end to be engaged by the yoke 8 on the member 6 as will be obvious.

The upper end of the handle member 5 is provided with a slot 11 extending inward a suitable distance and from one edge to the other. In this slot is inserted one end of the head 12 where it is secured by suitable fastening means 13. The head may be of any material suitable for the purpose for which it is intended and only as an illustration is it shown as consisting of a section of wire screen.

It is desirable in some instances to brace or strengthen the slotted end of the handle member 5 because of its weakened condition due to the formation of the slots. This is accomplished by mounting a plate 14 on each of the wider faces of the handle member and each plate has flanges 15 which embrace the edges of said handle member. The plates are positioned so as to extend above and below the position of the inner end of the slot and are secured in place by fastening means 16 passing through both plates and the handle member.

In using the ordinary short handled swatter it is often impossible to reach insects high up on the walls of a room or on the ceiling and it is unhandy to use one with a long handle, especially when the insect is in close proximity to the person using the same.

These disadvantages are completely overcome by the present invention because the handle members are contracted to provide a short handle when the device is used to swat insects nearby, but may be easily and quickly extended when it becomes necessary to reach greater distances than are possible with a short handle.

In Fig. 5, is illustrated a modified form of strengthening means wherein a single strip of metal is bent to provide plates 17 and flanges 18 with one of the flanges connecting the two plates.

The plate connecting flange has a slot 19 coinciding with the slot in the handle and the other flanges are spaced apart so as not to cross the slot in the handle.

Of course I do not wish to be limited to the exact details of construction herein shown and described as these may be varied within the limits of the appended claim without departing from the spirit of my invention.

Having thus fully described my invention, what I claim as new and useful is:—

In an insect swatter, a handle including two wooden members of oblong cross sectional shape located side by side for longitudinal sliding movement, means to slidably connect said members together, one of said members having a slot formed in its outer end, a head having a portion projecting into said slot, means to secure said head in place, flanged plates, one of which is mounted on each side of the slotted member in the region of the slot with the flanges extending over the edges of said member, each of said plates projecting above and below the position of the inner end of the slot, and fastening means passing through both plates and the member to secure said plates in place.

CHAS. C. BAILEY.